(12) United States Patent
Kim et al.

(10) Patent No.: US 7,720,182 B2
(45) Date of Patent: May 18, 2010

(54) APPARATUS AND METHOD FOR CORRECTING FREQUENCY OFFSET IN SATELLITE DIGITAL VIDEO BROADCASTING SYSTEM

(75) Inventors: Tae-Hoon Kim, Seoul (KR); Pan-Soo Kim, Daejon (KR); Dae-Ig Chang, Daejon (KR); Deock-Gil Oh, Daejon (KR); Seong-Jun Lee, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 685 days.

(21) Appl. No.: 11/636,243

(22) Filed: Dec. 8, 2006

(65) Prior Publication Data

US 2007/0133725 A1 Jun. 14, 2007

(30) Foreign Application Priority Data

Dec. 8, 2005 (KR) .................. 10-2005-0120112
Aug. 7, 2006 (KR) .................. 10-2006-0074358

(51) Int. Cl.
*H04L 1/00* (2006.01)

(52) U.S. Cl. ........................................... 375/346
(58) Field of Classification Search .............. 375/285, 375/346, 348, 349, 350; 348/729; 455/3.02
See application file for complete search history.

(56) References Cited

U.S. PATENT DOCUMENTS 5,943,132 A * 8/1999 Erskine .................. 356/484
6,650,285 B2 11/2003 Jandrell
2004/0017867 A1 * 1/2004 Thomas et al. ........... 375/346
2005/0058229 A1 * 3/2005 Alagha .................... 375/346

FOREIGN PATENT DOCUMENTS

| EP | 1045545 | 10/2000 |
| KR | 1020000039386 | 7/2000 |
| KR | 1020010045947 | 6/2001 |
| KR | 1020050081275 | 8/2005 |
| KR | 1020060016580 | 2/2006 |

OTHER PUBLICATIONS

Notice of Korean Patent Grant dated Aug. 29, 2007 for the corresponding application KR10-2006-0074358.
M. Shahid et al; "A Novel Carrier Frequency Estimator Suitable for the FFT-Based Multicarrier Demodulator" The Institution of Electrical Engineers, Nov. 1995.

* cited by examiner

*Primary Examiner*—Don N Vo
(74) *Attorney, Agent, or Firm*—Ladas & Parry LLP

(57) ABSTRACT

An apparatus and method for correcting a frequency offset in a satellite digital video broadcasting system includes a frequency response transformer for receiving a satellite digital video broadcasting signal and acquiring frequency responses divided into positive and negative frequency parts; a rotation/difference value calculation unit for selecting a frequency response inputted from the frequency response transformer and calculating a first value indicating a difference in area without rotation for the selected frequency response, and calculating a second value indicating a difference in area with rotation for the remaining frequency responses; a zero intersection point calculator for dividing an average slope of a straight line formed by the first and second values by the first value, and calculating a zero intersection point of an area difference value on the straight line; and a frequency offset estimator for correcting the zero intersection point to thereby estimate the frequency offset.

6 Claims, 3 Drawing Sheets

APPARATUS AND METHOD FOR CORRECTING FREQUENCY OFFSET IN SATELLITE DIGITAL VIDEO BROADCASTING SYSTEM

FIELD OF THE INVENTION

The present invention relates to a satellite digital video broadcasting system; and, more particularly, to an apparatus and method for correcting a frequency offset in the broadcasting system, which estimate a frequency offset so that a positive frequency part and a negative frequency part obtained by fast Fourier-transforming a satellite digital video broadcasting signal after receipt thereof are identical in area to each other, and convert the frequency offset into a value corresponding to an actual frequency to thereby correct the broadcasting signal.

DESCRIPTION OF RELATED ART

As well-known in the art, Digital Video Broadcasting via Satellite (DVB-S) is a satellite digital video broadcasting standard developed in Europe. The DVB-S adopts Quadrature Phase Shift Keying (QPSK) as modulation method. Due to this, the DVB-S does not recover signal when a frequency offset is more than 3 to 5%, and lowers transmission efficiency since data is sent less than an amount of data to be actually sent if channel state is good by the fixed modulation method, i.e., QPSK.

On the other hand, DVB-S version 2 Backward Compatible (DVB-S2 BC) is a satellite digital video broadcasting standard established to solve the above problems of the DVB-S.

Such DVB-S2 BC standard guarantees higher transmission efficiency by sending a signal followed by an additional signal while securing signal reception in an existing receiver for a continuous broadcasting reception.

The conventional DVB-S standard performs a frequency offset correction in which a signal that is modulated and received is subjected to symbol time, frequency and phase synchronization, and finally demodulation. In general, examples of the DVB-S standard include a technique of using transmitted data, a technique of deciding component of a received signal and then receiving that value with a recursive circuit to use it, and a technique of estimating a frequency offset without reference information. Especially, the DVB-S2 BC standard has to employ the technique of estimating the frequency offset without reference information since signal has no reference information.

Even though the DVB-S2 BC can estimate the frequency offset without reference information, however, it cannot estimate a frequency offset of more than certain amount.

SUMMARY OF THE INVENTION

It is, therefore, a primary object of the present invention to provide an apparatus and method for correcting a frequency offset in a satellite digital video broadcasting system, which estimate a frequency offset so that a positive frequency part and a negative frequency part obtained by fast Fourier-transforming a satellite digital video broadcasting signal after receipt thereof are identical in area to each other, and convert the frequency offset into a value corresponding to an actual frequency to thereby correct the broadcasting signal.

In accordance with one aspect of the present invention, there is provided an apparatus for correcting a frequency offset in a satellite digital video broadcasting system using a satellite digital video broadcasting signal, including: a frequency response transformer for receiving the satellite digital video broadcasting signal and acquiring a plurality of frequency responses divided into a positive frequency part and a negative frequency part; a rotation/difference value calculation unit for selecting one of the plurality of frequency responses inputted from the frequency response transformer and calculating a first area difference value indicating a difference in area between the positive frequency part and the negative frequency part without rotation for the selected frequency response, and calculating a second area difference value indicating a difference in area between the positive frequency component and the negative frequency component with rotation for the remaining frequency responses; a zero intersection point calculator for dividing an average slope of a straight line formed by the first area difference value and the second area difference value by the first area difference value, and calculating a zero intersection point of an area difference value on the straight line; and a frequency offset estimator for correcting the zero intersection point provided from the zero intersection point calculator to thereby estimate the frequency offset.

In accordance with another aspect of the present invention, there is provided a method for correcting a frequency offset in a satellite digital video broadcasting system using a satellite digital video broadcasting signal, including the steps of: receiving the satellite digital video broadcasting signal and acquiring a plurality of frequency responses divided into a positive frequency part and a negative frequency part; selecting one of the plurality of frequency responses and calculating a first area difference value indicating a difference in area between the positive frequency component and the negative frequency component without rotation for the selected frequency response, and calculating a second area difference value indicating a difference in area between the positive frequency component and the negative frequency component with rotation for the remaining frequency responses; dividing an average slope of a straight line formed by the first area difference value and the second area difference value by the first area difference value, and calculating a zero intersection point of an area difference value on the straight line; and correcting the zero intersection point to thereby estimate the frequency offset.

The other objectives and advantages of the invention will be understood by the following description and will also be appreciated by the embodiments of the invention more clearly. Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

The above-mentioned objectives, features, and advantages will be more apparent by the following detailed description associated with the accompanying drawings, and thus, the technical spirit of the invention will be readily conceived by those skilled in the art to which the invention pertains. Further, in the following description, well-known arts will not be described in detail if it appears that they could obscure the invention in unnecessary detail. Hereinafter, a preferred embodiment of the present invention will be set forth in detail with reference to the accompanying drawings.

Figure 1:
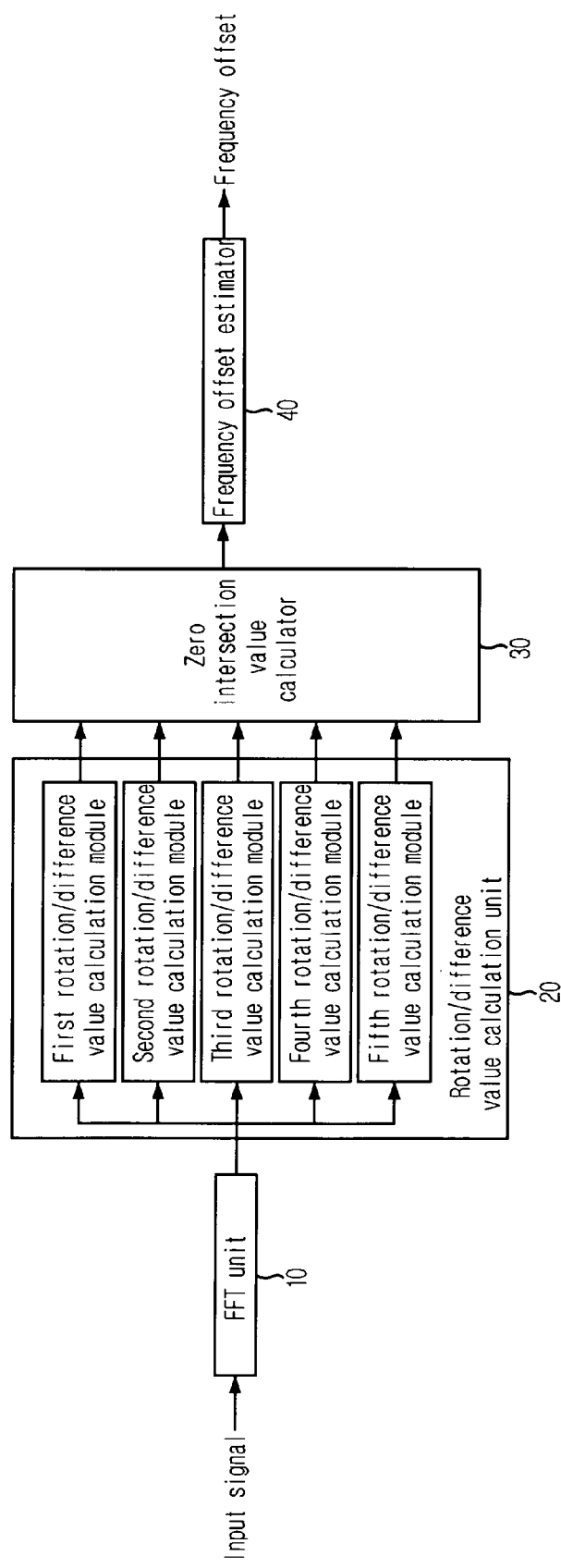
FIG. 1 is a diagram illustrating a configuration of an apparatus for correcting a frequency offset in a satellite digital video broadcasting system in accordance with a preferred embodiment of the present invention.

FIG. 1 is a diagram illustrating a configuration of an apparatus for correcting a frequency offset in a satellite digital video broadcasting system in accordance with a preferred embodiment of the present invention.

The frequency offset correction apparatus shown in FIG. 1 includes a Fast Fourier Transform (FFT) unit 10, a rotation/difference value calculation unit 20, a zero intersection point calculator 30 and a frequency offset estimator 40.

The FFT unit 10 performs N-point FFT with respect to a satellite digital video broadcasting signal (i.e., DVB-S2 BC mode signal) inputted from outside to acquire a frequency response thereof.

The FFT unit 10 has a characteristic that a positive frequency part and a negative frequency part are symmetry left and right in the frequency response of the input signal depending on nyquist filter characteristic at a transmitting end, to have the same area for the two parts.

However, the FFT unit 10 shows that the frequency response of the input signal is moved to the positive frequency part or negative frequency part by a frequency offset according to its direction and size upon existence of the frequency offset. That is, in such a case, the FFT unit 10 is allowed for each of the positive frequency part and the negative frequency part in the frequency response to have a different area.

The rotation/difference value calculation unit 20 is provided with five rotation/difference value calculation modules, each of which takes the frequency response value transformed by the FFT unit 10. Specifically, the rotation/difference value calculation unit 20 accepts the frequency response value and calculates a difference in area between a rotated positive frequency part and a negative frequency part through each rotation/difference value calculation module. For convenience of explanation, it is illustrated that such process will be performed in the rotation/difference value calculation unit 20, rather than the modules involved therein. Further, it is assumed that any one of the five modules, e.g., the third module does not rotate the frequency response value.

To be more specific, the rotation/difference value calculation unit 20 rotates the inputted frequency response value by a given number [i.e., (k, 2*k)] and in a given direction. Then, the results (i.e., the frequency response values except the result from the third rotation/difference value calculation module) are divided into two parts (i.e., by N/2) to calculate area difference values of the frequency responses of the two parts. At this time, the third rotation/difference value calculation module in the rotation/difference value calculation unit 20 calculates an area difference value without rotating the inputted frequency response value.

Further, the rotation/difference value calculation unit 20 performs the process as described above with respect to the frequency response repeatedly inputted from the FFT unit 10 several times and then resets the results, thereby making it possible to reflect the frequency offset change in the input signal.

The zero intersection point calculator 30 receives the area difference values of the frequency responses, i.e., the frequency responses excluding the result from the third rotation/difference value calculation module (hereinafter, "rotation difference values"), rotated by the rotation/difference value calculation unit 20, and the area difference value having no rotation, i.e., the frequency response of the result from the third rotation/difference value calculation module (hereinafter, "non-rotation difference value").

Further, the zero intersection point calculator 30 calculates a point (i.e., "zero intersection point") at which an area difference value becomes "0" on a straight line formed by the four rotation difference values and one non-rotation difference value. In other words, the zero intersection point calculator 30 calculates the zero intersection point by dividing an average slope of the straight line by the non-rotation difference value. The average slope of the straight line may be calculated by a conventional method, and therefore, its details will be omitted here for brevity.

The frequency offset estimator 40 verifies the zero intersection point provided from the zero intersection point calculator 30 and multiples it by a correction value to correct its error if any to thereby estimate the frequency offset. At this time, the frequency offset estimator 40 verifies the correction value during the process of the zero intersection point calculation in the zero intersection point calculator 30.

As set forth above, the frequency offset estimator 40 is provided to help correct an actual frequency by using the estimated frequency offset.

In addition, a "k" value is determined based on the fact that since the linear property of the five area difference values is good when "2*k" is within the pass band of the input signal, the correct zero intersection point can be found by minimizing a difference between the average slope of the straight line of the five values and an ideal slope. However, although the "k" value is within the pass band and the "2k" is within a transition area, the performance decrease is not large.

Figure 2:
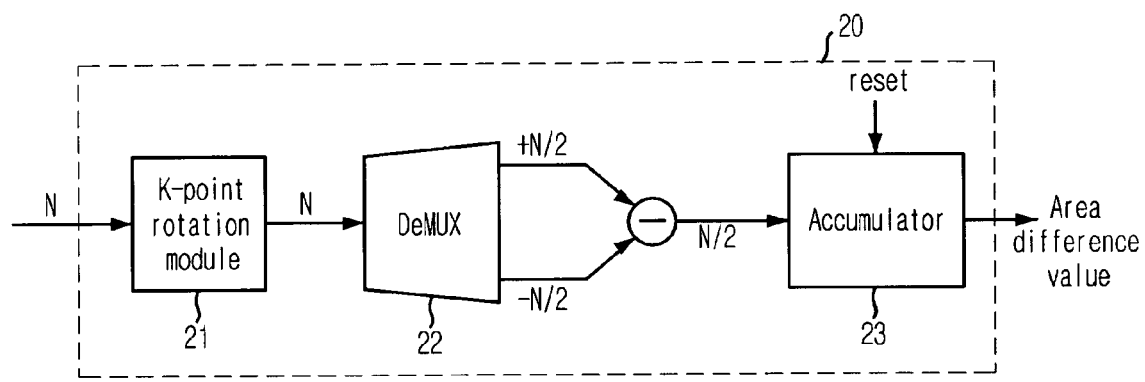
FIG. 2 is a diagram illustrating a configuration of the rotation/difference value calculation unit, to which the present invention is applied, as shown in FIG. 1.

FIG. 2 is a diagram illustrating a configuration of the rotation/difference value calculation unit 20, to which the present invention is applied, as shown in FIG. 1.

The rotation/difference value calculation unit 20, as shown in FIG. 2, is provided with a k-point rotation module 21, a demultiplexer (DeMUX) 22, and an accumulator 23.

The k-point rotation module 21 rotates the frequency response inputted from the FFT unit 10 according to the "k" value by a given number (k, 2*k) and in a given direction. At this time, the k-point rotation module 21 does not rotate the frequency response provided by the third rotation/difference value calculation module, as mentioned above.

Further, the k-point rotation module 21 delivers the four rotated frequency responses and one non-rotation frequency response to the DeMUX 22.

The DeMUX 22 divides the rotated frequency responses from the k-point rotation module 21 into two parts (+N/2, −N/2). Namely, the DeMUX 22 divides the rotated frequency responses into a positive frequency part +N/2 and a negative frequency part −N/2.

Further, the DeMUX 22 calculates an area difference value between the positive frequency part and the negative frequency part of the rotated frequency responses, and provides it to the accumulator 23.

The accumulator 23 temporarily stores a rotation difference value and a non-rotation difference value calculated by the DeMUX 22, and resets the values when the frequency response from the FFT unit 10 is repeatedly inputted several times.

Figure 3:
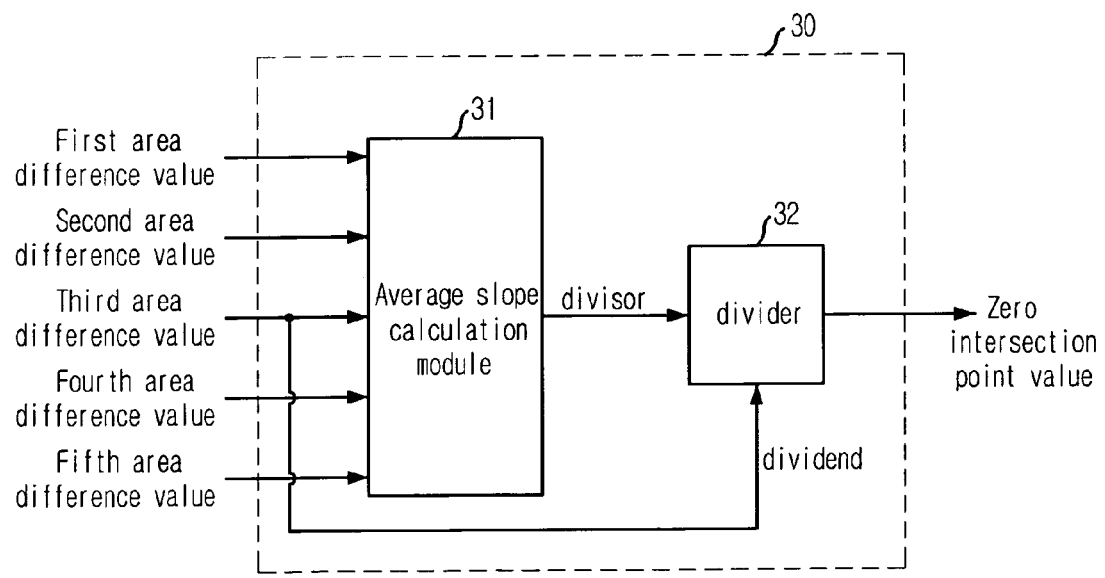
FIG. 3 is a diagram illustrating a configuration of the zero intersection point calculator, to which the present invention is applied, as shown in FIG. 1.

FIG. 3 is a diagram illustrating a configuration of the zero intersection point calculator 30, to which the present invention is applied, as shown in FIG. 1.

As shown therein, the zero intersection point calculator 30 is comprised of an average slope calculation module 31 and a divider 32.

The average slope calculation module 31 calculates an average slope of a straight line formed by the area difference values (i.e., the rotation difference values and non-rotation difference value) provided by the rotation/difference value calculation unit 20. At this time, the average slope calculation module 31 calculates the average slope of the straight line by using a conventional method, as described above.

The divider 32 calculates a zero intersection point based on the average slope (divisor) of the straight line formed by the area difference values calculated by the average slope calculation module 31 and the non-rotation difference value (dividend).

Figure 4:
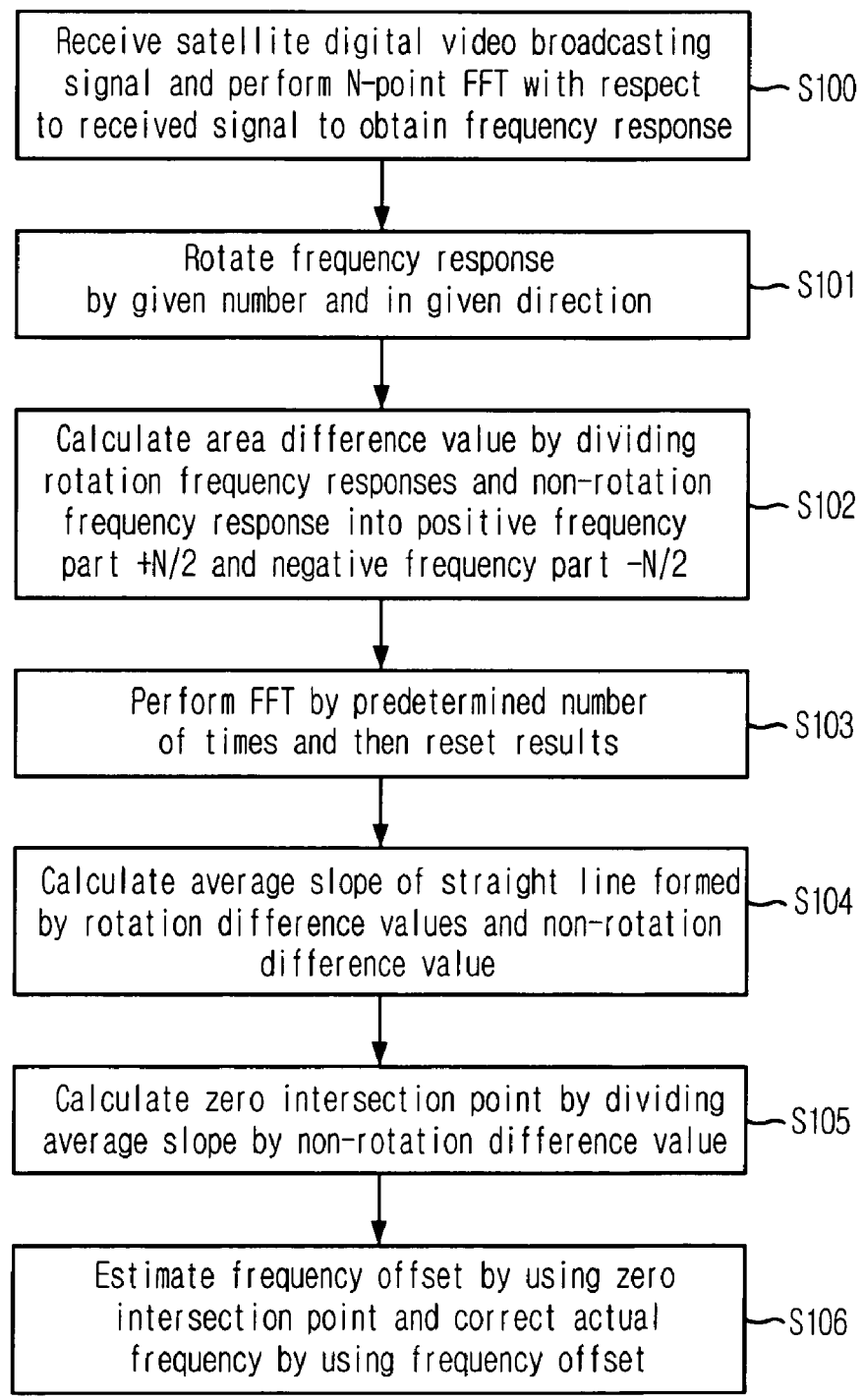
FIG. 4 is a flowchart illustrating a method of correcting a frequency offset in a satellite digital video broadcasting system in accordance with the present invention.

FIG. 4 is a flowchart illustrating a method of correcting a frequency offset in a satellite digital video broadcasting system in accordance with the present invention.

First of all, the frequency offset correction apparatus receives a satellite digital video broadcasting signal and then performs N-point FFT with respect to the received signal to obtain a frequency response at step S100.

Thereafter, the correction apparatus rotates the frequency response by a given number (k, 2*k) and in a given direction at step S101, wherein rotation frequency responses and non-rotation frequency response are outputted.

At a next step S102, the correction apparatus calculates an area difference value of frequency areas formed by dividing the rotation frequency responses and the non-rotation frequency response into a positive frequency part +N/2 and a negative frequency part −N/2. At this time, the correction apparatus calculates rotation difference values by the rotation frequency responses, and non-rotation difference value by the non-rotation frequency response.

And then, at step S103, the correction apparatus repeatedly performs the FFT process by a predetermined number of times and then resets the results, thereby allowing the frequency offset to be reflected in an actual frequency.

Meanwhile, the correction apparatus calculates an average slope of a straight line formed by the rotation difference values and the non-rotation difference value calculated in the above at step S104. At this time, the correction apparatus calculates a zero intersection point by dividing the average slope of the straight line by the non-rotation difference value at step S105.

At a final step S106, the correction apparatus estimates a frequency offset by multiplying the zero intersection point by a preset constant value, and corrects the actual frequency by using the estimated frequency offset.

As described above, the present invention can estimate a relatively correct frequency offset of a satellite digital video broadcasting signal even at lower SNR.

Furthermore, the present invention can estimate a relatively correct frequency offset, without reference information, even when the offset is relatively large.

In addition, the present invention does not affect on the demodulation algorithm, and thus, can be applied to the existing systems.

The method of the present invention as mentioned above may be implemented by a software program that is stored in a computer-readable storage medium such as CD-ROM, RAM, ROM, floppy disk, hard disk, optical magnetic disk, or the like. This process may be readily carried out by those skilled in the art; and therefore, details of thereof are omitted here.

The present application contains subject matter related to Korean patent application No. 2005-120112 and 2006-74358, filed with the Korean Intellectual Property Office on Dec. 8, 2005, and Aug. 7, 2006, respectively, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. An apparatus for correcting a frequency offset in a satellite digital video broadcasting system using a satellite digital video broadcasting signal, comprising:
    a frequency response transform means for receiving the satellite digital video broadcasting signal and acquiring a plurality of frequency responses divided into a positive frequency part and a negative frequency part;
    a rotation/difference value calculation means for selecting one of the plurality of frequency responses inputted from the frequency response transform means and calculating a first area difference value indicating a difference in area between the positive frequency part and the negative frequency part without rotation for the selected frequency response, and calculating a second area difference value indicating a difference in area between the positive frequency component and the negative frequency component with rotation for the remaining frequency responses;
    a zero intersection point calculation means for dividing an average slope of a straight line formed by the first area difference value and the second area difference value by the first area difference value, and calculating a zero intersection point of an area difference value on the straight line; and
    a frequency offset estimation means for correcting the zero intersection point provided from the zero intersection point calculation means to thereby estimate the frequency offset.

2. The apparatus as recited in claim 1, wherein the rotation/difference value calculation means includes:
    a first rotation/difference value calculation module for calculating the first area difference value; and
    at least one second rotation/difference value calculation module for calculating the second area difference value.

3. The apparatus as recited in claim 2, wherein the first and second rotation/difference value calculation modules further include a temporary storage unit for temporarily storing the first area difference value or the second area difference value, and resetting the values when the frequency response is repeatedly inputted from the frequency response transform means by a predetermined number of times.

4. The apparatus as recited in claim 1, wherein the zero intersection point calculation means includes:
    an average slope calculation means for calculating an average slope of a straight line formed by the first area difference value and the second area difference value inputted from the rotation/difference value calculation means; and
    a zero intersection point calculation means for calculating a zero intersection point by dividing the average slope of the straight line from the average slope calculation means by the first area difference value from the rotation/difference value calculation means.

5. A method for correcting a frequency offset in a satellite digital video broadcasting system using a satellite digital video broadcasting signal, comprising the steps of:

receiving the satellite digital video broadcasting signal and acquiring a plurality of frequency responses divided into a positive frequency part and a negative frequency part;

selecting one of the plurality of frequency responses and calculating a first area difference value indicating a difference in area between the positive frequency component and the negative frequency component without rotation for the selected frequency response, and calculating a second area difference value indicating a difference in area between the positive frequency component and the negative frequency component with rotation for the remaining frequency responses;

dividing an average slope of a straight line formed by the first area difference value and the second area difference value by the first area difference value, and calculating a zero intersection point of an area difference value on the straight line; and correcting the zero intersection point to thereby estimate the frequency offset.

6. The method as recited in claim 5, wherein said selecting and calculating step further includes the step of resetting the first area difference value and the second area difference value when the frequency response is repeatedly inputted by a predetermined number of times.

* * * * *